(No Model.)
D. PRENDERGAST.
SPOUT FOR SHEET METAL VESSELS.
No. 377,048. Patented Jan. 31, 1888.
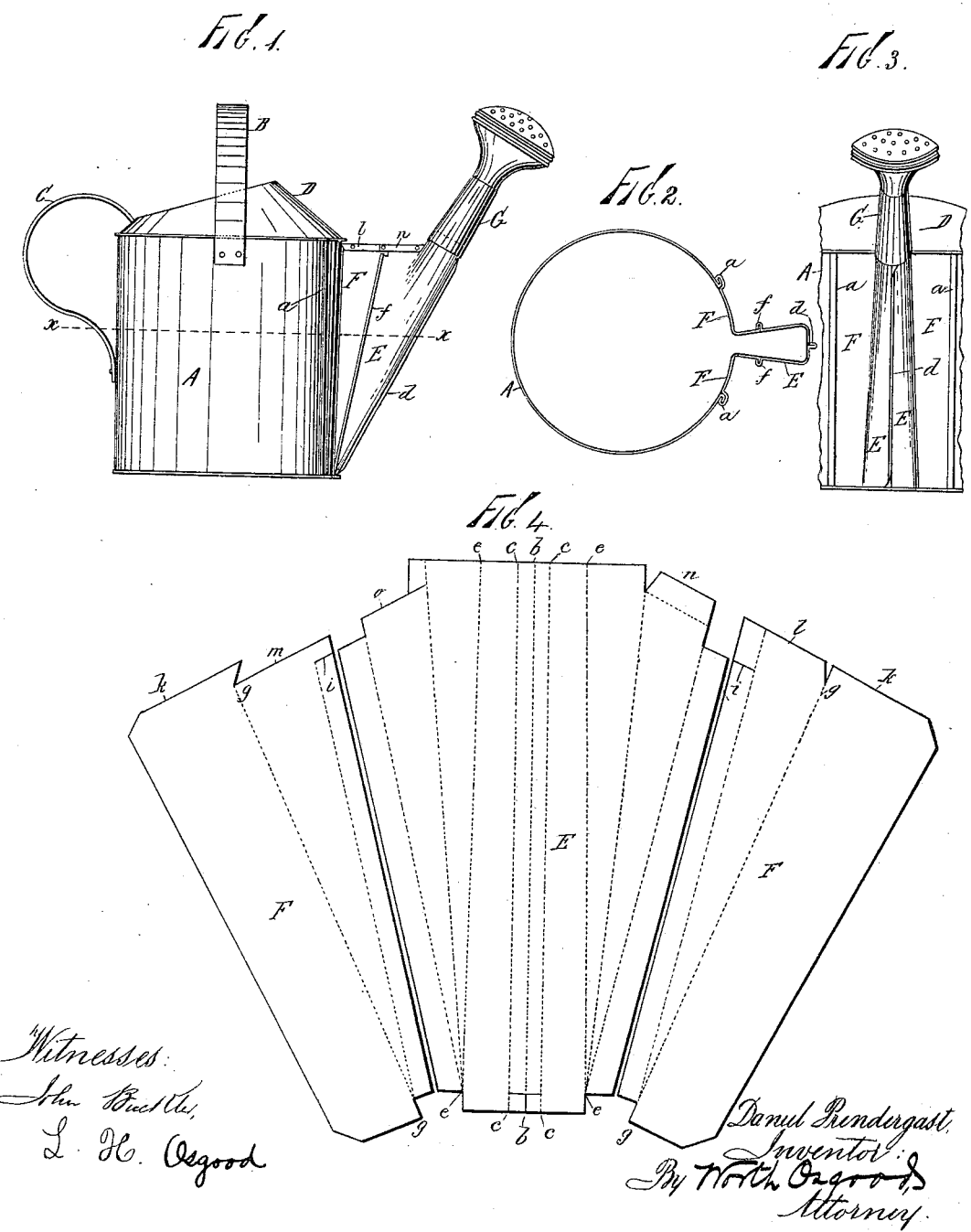

UNITED STATES PATENT OFFICE.

DANIEL PRENDERGAST, OF NEW YORK, ASSIGNOR TO HENRY WELLINGTON, OF BROOKLYN, NEW YORK.

SPOUT FOR SHEET-METAL VESSELS.

SPECIFICATION forming part of Letters Patent No. 377,048, dated January 31, 1888.

Application filed June 9, 1887. Serial No. 240,700. (No model.)

*To all whom it may concern:*

Be it known that I, DANIEL PRENDERGAST, of New York city, county and State of New York, have invented certain new and useful Improvements in Spouts for Sheet-Metal Vessels, of which the following is a full, clear, and exact description, reference being had to the accompanying drawings, and to the letters of reference marked thereon.

My invention has relation to the construction of spouts for sheet-metal vessels, especially such as are employed for watering or sprinkling purposes and known as "watering-pots" or "sprinkling-pots;" but my improvements are likewise applicable in connection with pots or vessels for other purposes, such as tea-kettles, oiling-cans, and the like, wherein it may be desirable to employ a spout of large size or capacity, which should at the same time be amply strong and rigid to bear the strains and concussions to which it is subjected during ordinary use.

The object of my invention is to provide the vessel (of whatever character or name) with a spout which is easily applied, which is stiffened or strengthened in each and every direction, which is simple and easy to make, which will afford the desired capacity for delivering liquids from the vessel, and which will require no extra brace between it and the vessel, being at the same time economical of material required for its construction or manufacture.

To accomplish all of this my improvements involve certain new and useful peculiarities of construction and relative arrangements or combinations of parts and details of manufacture, as will be herein first fully described, and then pointed out in the claims.

In the accompanying drawings, forming part of this specification, I have shown my improved form of spout applied upon or in connection with the body of an ordinary watering or sprinkling pot, this illustration being sufficient for purposes of the present specification.

In the drawings, Figure 1 is a side elevation of the vessel complete and having the spout made and applied in accordance with my invention. Fig. 2 is a horizontal sectional view upon a plane through line $xx$ of Fig. 1. Fig. 3 is a view in front elevation, showing the wide base or bottom part of the spout. Fig. 4 is a plan view showing the three pieces of sheet metal of which the improved spout is formed, the same being flat and cut or trimmed ready to be bent and united with each other and with the body and bottom of the vessel in accordance with my invention.

In all the figures like letters of reference, wherever they occur, indicate corresponding parts.

A is the body of the vessel, which (in the case of the watering-pot) is supplied with two handles, B C, and the usual form of breast, D; but the parts B, C, and D may be omitted or replaced by other parts, according to the purpose of the vessel.

The spout is connected with the body of the vessel as along the vertical seams $a\ a$, the opening or the passage between the two parts being wide at the bottom and contracted at the top. The body of the vessel may be made in one, two, or more pieces.

The improved spout is made up of three separate pieces cut and formed as indicated in Fig. 4. The central piece (represented at E) is creased along the central dotted line $b\ b$ and bent along the lines $c\ c$, thus forming the front rib, $d$, which extends from top to bottom of the spout and operates to stiffen the extreme front not only in the direction of its length, but crosswise as well, and it prevents the spout from being dented or bent at the front—a kind of accident or damage to which, in ordinary forms, such spouts are extremely liable. The central piece, E, is also bent along the lines $e\ e$ to form the corners of the front of the spout, and is seamed and locked or beaded with the two side pieces, F F, to form the side joints, $f f$, and these joints, occupying about the middle lines from top to bottom on the sides of the spout and projecting similarly to the rib $d$, strengthen the sides of the spout both vertically and laterally. The side pieces are bent along the lines $g\ g$ to make them conform to the general contour of the front of the vessel, and they are seamed and locked or beaded with the body of the vessel at $a\ a$. The slits represented at $i\ i$ are for the purpose of permitting the margins of the side pieces to be beaded or locked with the adjacent margins of the central piece, leaving material enough on the side pieces to close the notches at the upper corners of the central pieces. The slits at the middle of the bottom of the central piece are for the purpose of enabling the lower margin of the spout to be beaded and locked with the bottom piece of the vessel, same as is the body to which the spout is applied. Of the side pieces, the parts k k are intended to be beaded with the breast D or with the corresponding top of the vessel, of whatever form that may be. The part l on one side piece overlaps the part or portion m on the other, and is riveted or soldered in place, and the part n on the central piece overlaps the part o and is similarly secured, making the top of the spout, except the outlet, perfectly watertight. The portion of the central piece between the parts n and o forms the cylindrical end of the spout, to which any extension, as G, may be applied, if desired.

It has heretofore been proposed to make the body of the vessel of one piece and the spout of another and to unite the two, so as to have no brace between them, save what is formed by the spout itself; but the spouts so made and applied require special machinery, necessitate considerable waste of material, and are weak in every direction, becoming dented and bent or damaged.

By my improved construction I am enabled to make the spouts of small pieces of metal, thereby economizing material, to bend and apply them without special bending tools, and, more than all, to strengthen the spouts against bending or yielding in each and every direction, and at the same time dispensing with any separate brace between the body and spout.

Having now fully described my invention, what I claim as new herein, and desire to secure by Letters Patent, is—

1. In a spout for sheet-metal vessels, the combination, with the two side pieces, of the central piece united therewith and provided with the stiffening or strengthening rib extending from top to bottom along its front, substantially as shown and described.

2. The herein-described spout for sheet-metal vessels, composed of three pieces united by seams or joints projecting and extending from top to bottom for the purpose of stiffening the sides of the spout, substantially as explained.

3. In combination with the body of the vessel, the spout made of three pieces united as explained, and having the two side seams or ribs and the central front rib, substantially as shown and described.

In testimony that I claim the foregoing I have hereunto set my hand in the presence of two witnesses.

DANIEL PRENDERGAST.

Witnesses:
JOHN BUCKLER,
WORTH OSGOOD.